United States Patent [19]

Kinosada et al.

[11] Patent Number: 5,135,984
[45] Date of Patent: Aug. 4, 1992

[54] MODIFIED CHLORINATED POLYOLEFIN COMPOSITES

[75] Inventors: Masaji Kinosada, Takasago; Ryozo Orita, Himeji; Shingo Tone; Toshimitsu Saito, both of Takasago, all of Japan

[73] Assignee: Toyo Kasei Kogyo Company Limited, Osaka, Japan

[21] Appl. No.: 693,457

[22] Filed: Apr. 29, 1991

[30] Foreign Application Priority Data

Apr. 27, 1990 [JP] Japan .................................. 2-112190

[51] Int. Cl.$^5$ ...................... C08L 23/26; C08L 23/28; C08F 255/02
[52] U.S. Cl. .................................... 525/193; 525/192; 525/285
[58] Field of Search .............................. 525/193, 285

[56] References Cited

FOREIGN PATENT DOCUMENTS 57-036128 2/1982 Japan .

Primary Examiner—Carman J. Seccuro
Attorney, Agent, or Firm—Wenderoth, Lind & Ponack

[57] ABSTRACT

Modified chlorinated polyolefin compositions containing, as a main ingredient, a modified chlorinated polyolefin which is obtained by reacting together, in an organic solution, a chlorinated polyolefin, maleic acid anhydride, a (meth)acryl-modified hydrogenated polybutadiene and an organic peroxide. The modified chlorinated polyolefin compositions may be used in coating compositions, adhesives for polyolefines and as printing ink binders.

4 Claims, No Drawings

MODIFIED CHLORINATED POLYOLEFIN COMPOSITES

BACKGROUND OF THE INVENTION

1. Field of the Invention

The present invention relates to a modified chlorinated polyolefin composition containing, as a main component, a modified chlorinated polyolefin which is obtained by adding a liquid gum and maleic acid anhydride thereto. The composition of the present invention may be used as a primer, a vehicle for coatings, a coating reagent, an adhesive and as a binder for printing inks.

2. Description of the Prior Art

Formerly, chlorinated polyolefins had the following defects:

(a) Low adhesive capacity for polar materials;
(b) Poor mutual solubility for other polar resins;
(c) Inferior solubility to polar solvents; etc.

In particular, when these chlorinated polyolefins are used as a primer for coating of polyolefin materials, the the adhesive capacity, gasoline resistance and waterproof properties are insufficient between the chlorinated polyolefin and the coating. Therefore, formerly, in order to improve the above-described defects, epoxy, hydroxyl, amino or carboxy radicals were introduced into the chlorinated polyolefin, and it was well known to introduce maleic acid anhydride into the chlorinated polyolefin [Published Unexamined Japanese Patent Applications No. 24316 (1976), No. 36128 (1982), No. 215667 (1986), and No. 28123 (1982)].

SUMMARY OF THE INVENTION

Generally the heat stability of a chlorinated polyolefin is inferior at high temperatures. For instance, where the chlorinated polyolefin is reacted with maleic acid anhydride at a high temperature for a long time, dehydrochlorination, degradarion and coloration of the reaction product occur. On the other hand, where the chlorinated polyolefin is reacted with maleic acid anhydride at a comparatively low temperature, the addition efficiency of the maleic acid anhydride to the chlorinated polyolefin is low and a large amount of the maleic acid anhydride remains unreacted, so that the adhesive property of the chlorinated polyolefin becomes lower. Moreover, the solution of the chlorinated polyolefin using a better solvent becomes nonuniform, because the unreacted maleic acid anhydride precipitates in the solution, and complicated processes are necessary to remove the unreacted maleic acid anhydride, so these processes are not practical.

Therefore, in order to improve these defects of the chlorinated polyolefin which are summarized below as defects (1)–(4), the inventors of the present invention aim to offer a modified chlorinated polyolefin composition comprising a modified chlorinated polyolefin as the main ingredient by adding liquid gum and maleic acid anhydride to the chlorinated polyolefin effectively by a simple industrially practical method under mild conditions.

Defects of a Conventional Chlorinated Polyolefin (1) The adhesive power of the chlorinated polyolefin is weak for polar materials.
(2) Its mutual solubility for other resins is poor.
(3) Its solubility to a polar solvent is low.
(4) Where the chlorinated polyolefin is used as a primer, the adhesive power, gasoline resistance and waterproof properties between the chlorinated polyolefin and the coating are insufficient.

DETAILED DESCRIPTION OF THE INVENTION

The present invention relates to a modified chlorinated polyolefin composition having a modified chlorinated polyolefin as the main ingredient, obtained by adding acryl or methacryl hydrogenated polyolefin and maleic acid anhydride to the chlorinated polyolefin. More specifically, it is obtained by reacting and heating the following mixtures of components (A), (B), (C) and (D):

(A) Chlorinated polyolefin containing 5–75 weight % chlorine, 100 parts by weight;
(B) Maleic acid anhydride, 0.1–10 parts by weight;
(C) Acryl or methacryl modified hydrogenated polybutadiene containing at least one acryloyl group or methacryloyl group per unit molecule, 0.1–60 parts by weight; and
(D) Organic peroxides, 0.3 to 30 parts by weight.

It is suitable that the acryl or methacryl modified hydrogenated polybutadiene be a mixture made from acryl or methacryl modified hydrogenated polybutadiene in 0.1 to 60 parts by weight and a polydiene liquid gum in 0.1 to 20 parts by weight.

The chlorinated polyolefins used in the present invention are the polyolefins, for example, polypropylene, polyethylene, ethylene-propylene copolymer, polyisobutylene, ethylene-vinylacetate copolymer, and olefins gum which are chlorinated by the method disclosed in Published Examined Japanese Patent Application No. 5759 (1973).

The chlorine content of the polyolefin is 5–70 weight %, preferably 10–60 weight %. Where the chlorine content of the chlorinated polyolefin is under 5 weight %, the characteristics of the chlorinated polyolefin are not shown. On the other hand, where the chlorine content is over 75 weight %, the adhesive property lowers. Hence, where the chlorine content is not within the specified range, the object of the present invention cannot be achieved.

The solvent used in the present invention is satisfactory so long as it is a good solvent for the chlorinated polyolefins. For example, a conventional hydrocarbon solvent such as toluene, benzene, xylene, mesitylene, carbontetrachloride, etc. are preferably used.

The amount of maleic acid anhydride used for the present invention is 0.1–10 weight % for the amount of chlorinated polyolefins used, as described in (B) above. Where the amount of maleic acid anhydride used is below 0.1 weight %, the improvement in the various defects of the chlorinated polyolefin is not sufficient, and where the amount of maleic acid anhydride is over 10 weight %, the suitable effect is not attained and is thus uneconomical.

Acrylic or methacrylic modified polybutadiene having at least one acryloyl or methacryloyl group in the molecule is obtained by reacting the hydrogenated polybutadiene having at least one hydroxyl radical or carboxyl radical to the compounds having an acrylic or methacrylic radical. These reactions are explained in detail as follows:

The acrylic or methacrylic modified polybutadiene is obtained (i) by an esterification reaction of the hydrogenated polybutadiene having a hydroxide radical to acrylic acid or methacrylic acid, or (ii) by an addition reaction of the prepolymer obtained previously by the reaction of disocyanate compounds or hydroxyacrylate or hydroxymethacrylate to hydropolybutadiene having a hydroxyl group, or (iii) by a ring-opening esterification reaction of hydrogenated polybutadiene containing a carboxyl group to glycidyl acrylate or glycidyl methacrylate, or (iv) by an addition reaction of iminolacrylate or iminolmethacrylate to hydrogenated polybutadiene containing a carboxyl group, etc. Acrylic or methacrylate modified hydrogenated polybutadiene has the effect of avoiding the formation of insoluble polymer formed during the heating reaction as compared to polybutadiene liquid gum by the hydrogenation, which diminishes the unsaturated double bond during the heating reaction of the present invention. And, it has the effect of improving the defects of the chlorinated polyolefin owing to having a polar molecule. The amount of acrylic or methacrylic modified hydrogenated polybutadiene used in the present invention is 0.1-14 60 weight parts per 100 parts of the chlorinated polyolefin used. Where the content of acrylic or methacrylic modified polybutadiene is under 0.1 weight parts, improvement in the defects of the chlorinated polyolefin is small, and where the content is over 60 weight parts, the effect in proportion to the amount used is small and moreover it remarkably lowers the adhesive property to the polyolefins.

The polybutadiene liquid gum used in the present invention is a polymer having a number average molecular weight 500–10,000 of which the main ingredient is dienepolymers. These liquid gums are, for example, 1,2-polybutadiene, 1,4-polybutadiene, polyisoprene, polychloroprene, 1,2-polypentadiene, styrene-butadiene copolymer and acrylonitril-butadiene copolymer which have functional radicals such as carboxyl, hydroxyl, mercapto, epoxy, imino, and isocyanate radicals or an unsaturated carboxylic half ester having a hydroxyl 1,2-polybutadiene or 1,4-polybutadiene as the end group, or 1,2-polybutadiene, 1,4-polybutadiene, styrene-butadiene-copolymer or acrylo, nitril-butadiene copolymer having no functional group or acrylonitril-butadiene copolymer etc., or moreover a mixture of the above-described liquid gums.

The above-described liquid gums have the effect of raising the component reactive in the addition reaction of the maleic acid anhydride. The amount of the liquid gum used is 0.1–20 weight parts per 100 parts of chlorinated polyolefin. Where the amount of the liquid gum is under 0.1 weight parts, it is not sufficient to raise the addition rate of the maleic acid anhydride, and where the liquid gum used is over 20 weight parts, the effect in proportion to the amount of liquid gum used is small or nonexistant and thus uneconomical.

The reaction temperature and reaction time of the present invention are determined by the kind of amount of chlorinated polyolefin, acrylic or methacrylic modified hydrogenated polybutadiene, polydiene liquid gum, organic peroxide and solvent used, but a suitable reaction temperature is 50° to 180° C., and it is acceptable to react the mixture for a short time at a high temperature or for a long time at a low temperature, owing to the heat stability and additive efficiency of the chlorinated polyolefin.

It is necessary that the organic peroxides used in the present invention dissolve in the solvent used. These peroxides are, for example, benzoyl peroxide, dialkylperoxide, ketonperoxide peroxyester, hydroperoxide or percarbonate, etc. Moreover it is necessary to select from the components of these mixtures giving due consideration to the reaction temperature and time. The amount of the organic peroxide used is 0.3 to 30 weight parts per 100 weight parts of the chlorinated polyolefin used. Where the amount of the peroxide used is below 0.3 weight parts, the additive efficiency of the chlorinated polyolefin is lower, and where the amount of the organic peroxide used is over 30 weight parts, the higher effect equivalent to the amount of the organic peroxide used cannot be obtained. Regarding the addition method of these peroxides, it is advantageous to add the peroxide separately several times or to add it continuously dropwise from the standpoint of addition efficiency, rather than to add the entire amount of the peroxide at once when the reaction starts.

EXAMPLES

Example 1

(i) 500 weight parts of HARDLEN 13-LB (chlorinated polyolefin, manufactured by Toyo Kasei Kogyo Co., Ltd.) dissolved in toluene, the polyolefin being characterized by:
resin content of 29.5 weight %
chlorine content of resin 25.0 weight %;

(ii) acrylate modified hydrogenated polybutadiene (NISSO TEAI-1000, manufactured by Nihon Soda Co., Ltd.) 6.1 weight parts;

(iii) Maleic acid anhydride, 1.5 weight parts.

A solution mixture of (i)–(iii) above was agitated and heated to a temperature up to 90° C. and then 1.0 weight parts of benzoyl peroxide was added. After 1 hour, another 0.4 weight parts of benzoyl peroxide was added, and then after 2 hours and 3 hours, successive 0.4 weight parts of benzoyl peroxide was added. These mixtures were caused to react under agitating and heating at the same temperature for 2 hours. After this, a solution of modified chlorirated polyolefin composites containing 31.2 weight % of solid matter was obtained. At the conclusion of the reaction, the solution was transparent and uniform and the deposition of the maleic acid anhydride was not recognized.

Example 2

In Example 1, the NISSO TEAI-1000 polybutadiene was changed to another acrylate modified hydrogenated polybutadiene (NISSO TEAT-3000 manufactured by Nihon Soda Co., Ltd.). The other components used in Example 1 were unchanged and were reacted similarly as in Example 1.

A solution of modified hydrogenated polypropylene was obtained, and at the conclusion of the reaction, the solution was transparent and uniform and the deposition of the maleic acid anhydride was not recognized.

Example 3

(i) HARDLEN 13-LB, characterized by:
resin content of 20 to weight %
chlorine content of the resin 25.2 weight %, 450 weight parts;

(ii) NISSO TEAI-1000, 3.6 weight parts;

(iii) 1,4-polybutadiene having a hydroxyl radical at the end (R-45HT, manufactured by the IDEMITSU Petroleum Chemical Co., Ltd.), 1.8 weight parts; and (iv) Maleic acid anhydride, 2.2 weight parts.

The mixture was heated and agitated and after the solution temperature reached 100° C., 1.6 weight parts of t-butyl-peroxy-2ethyl hexanoate was added dropwise to the solution over 3 hours, and then the solution was heated and agitated for 2 hours at the same temperature, obtaining a solution of modified chlorinated polypropylene composites containing 24.2 weight % solid matter. At the conclusion of the reaction, the solution was transparent and uniform and the deposition of maleic acid anhydride was not recognized.

Comparative Example 1

The NISSO TEAI-1000 polybutadiene used in Example 1 was not used. Otherwise, the other components which were used in Example 1 were reacted similarly as in Example 1 and there was obtained a solution of modified polypropylene composites after the reaction was completed. The solution was transparent and the deposition of the maleic acid anhydride was not recognized.

Comparative Example 2

NISSO TEAI-1000 in Example 1 was changed to NISSO TEA-1000 (acrylomodified 1.2 - polybutadiene manufactured by NIHON SODA CO., LTD.), and the components were reacted as in Example 1 to obtain a solution of modified chlorinated polypropylene composites containing 31.3 weight % solid matter, but after the reaction was completed, the solution is turbid.

Comparative Example 3

In this case, HARDLEN 13-LB (not modified) was used only for the sample.

EXPERIMENTAL RESULTS

The modified chlorinated polypropylene composites or the chlorinated polypropylene obtained in Examples 1-3 were used as the primer for a paint, and the primary adhesion, gasoline resistance and waterproof properties were evaluated. These results are shown in Table 1.

TABLE 1

| Property Experiment | Primary Adhesion | Gasoline Resistant Property | Waterproof Test | |
|---|---|---|---|---|
| | | | 40° C. × 240 h | 60° C. × 240 h |
| Exp. 1 | 100/100 | ⊚ | 100/100 | 100/100 |
| Exp. 2 | 100/100 | ⊚ | 100/100 | 100/100 |
| Exp. 3 | 86/100 | ⊚ | 100/100 | 100/100 |
| Comp. Exp. 1 | 86/100 | X | 92/100 | 90/100 |
| Comp. Exp. 2 | 95/100 | | 95/100 | 95/100 |
| Comp. Exp. 3 | 55/100 | X | 23/100 | 30/100 |

Test Methods

The test methods used in the present invention are as follows:

(1) Preparation of the coating plate

Polypropylene plates having sizes of 100 mm×50 mm×20 mm obtained from injection molding of MITSUI Nobren SB-E 3 (manufactured by MITSUI TOATSU CO. LTD.) were washed with 1,1,1-trichlorethane, and these polypropylene plates were coated with the solution of modified chlorinated polypropylene composites or the solution of chlorinated polypropylene made in Examples 1-3 and Comparative Examples 1-3, so as to give a film of 5 microns in thickness after drying by using a barcoater. Then, these polypropylene plates were air-dried at room temperature for 3 hours and after drying each polypropylene plate was spray-coated, so as to give a film of 50-60 microns in thickness after drying, with diluted double liquid type polyurethan coatings using LETAN PG80 (manufactured by KANSAI PAINT CO. LTD.), which are made from a mixture of a ratio of main ingredient: hardening reagent: thinner=100:25:50, left to stand for 20 minutes at room temperature, heated and dried at 80° C. for 40 minutes, and then left to stand for 2 days, thereby the coated plates were prepared.

(2) Primary adhesion property (cross cut tape test)

A grid test was made in accordance with the method of JISK 5400 (1900) (cross cut tape test) using 100 grids of coated film with a space of 1 mm intervals made by a cutter knife by cutting at right angles 11 lines lengthwise and breadthwise reaching the polypropylene ground coat. Adhesive cellophane tape (manufactured by NICHIBAN Cellophane Co., Ltd.) was stuck on the coated film, and the primary adhesion property was evaluated by the remaining number of grids at the time when the adhesive cellophane tape was peeled off.

(3) Gasoline resistance test

Diagonal lines were cut on each of the coated surfaces of the coated plates by a cutter knife so that the diagonal lines reached the ground coat, and the coated plates were dipped in a regular gasoline (manufactured by NIHON SEKIYU CO., LTD.) for 2, 4 and 6 hours, and the coated film was evaluated by observing the separation of the coated film. The symbols concerning the evaluation used in Table 1 have the following meanings:

x: Separation was observed after 2 hours of dipping;
Δ Separation was not observed after 2 hours of dipping, but was observed after 4 hours of dipping;
○: Separation was not observed after 4 hours of dipping, but was observed after 6 hours of dipping;
⊚: Separation was not observed after 6 hours of dipping.

(4) Waterproof test

Each coating plate was dipped for 240 hours in running water and then the plates were evaluated by the cross cut tape test indicated in the above paragraph (2).

EFFECT OF THE INVENTION

The effects of the present invention are summarized as follows:

(a) The modified chlorinated polyolefin composites of the present invention are manufactured by such a mild condition that the chlorinated polyolefin has little separation of hydrochloric acid, deterioration and coloration.

(b) The modified chlorinated polyolefin composites of the present invention can easily be prepared by adding maleic acid anhydride successively after the chlorination of polyolefin, and so the modified chlorinated polyolefin composites are manufactured in an effective and simple manner suitable for industrial purposes.

(c) The modified chlorinated polyolefin composites of the present invention maintain the characteristics of the chlorinated polyolefin heretofore in use. Moreover, the present invention improves the following defects (1)-(3) of those conventional chlorinated polyolefins heretofore in use:

(1) weak adhesive force for the polar molecule.
(2) poor compatibility with other resins.
(3) low solubility to the polar solvent.

Where the chlorinated polyolefin composites of the present invention are used as a primer for a polyolefin coating, the adhesive property, gasoline resistance and waterproof properties of the coatings are especially improved.

What we claim is:

1. A modified chlorinated polyolefin composition comprising, as a main ingredient, a modified chlorinated polyolefin obtained by reacting together
   (A) a chlorinated polyolefin containing 5-75 weight % chlorine, 100 parts by weight, dissolved in a suitable solvent,
   (B) maleic acid anhydride, 0.1-10 parts by weight,
   (C) an acryl- or methacryl- modified hydrogenated polybutadiene having at least one acryloyl or methacryloyl radical per unit molecule, 0.1-60 parts by weight, and
   (D) an organic peroxide, 0.3 to 30 parts by weight.

2. A modified chlorinated polyolefin composition according to claim 1, wherein component (C) comprises a mixture of from 0.1-60 parts by weight of the acryl- or methacryl- modified hydrogenated polybutadiene and from 0.1 to 20 parts by weight of a polydiene liquid gum which has a number average molecular weight in the range of from 500 to 10,000 and whose main ingredient is the dienepolymer.

3. A modified chlorinated polyolefin composition according to claims 1 or 2, wherein the acryl- or methacryl- modified polybutediene is obtained by reacting a hydrogenated polybutadiene having at least one hydroxyl radical or carboxyl radical in the molecule with an acryloyl- or methacryloyl-group containing compound.

4. A modified chlorinated polyolefin composition according to any one of claims 1, 2, or 3, wherein the components (A), (B), (C) and (D) are reacted together at a temperature within the range of from 50° to 180° C.

* * * * *